United States Patent
Trojer et al.

(10) Patent No.: US 8,555,479 B2
(45) Date of Patent: Oct. 15, 2013

(54) METHOD FOR CLINCHING THICK METAL WORKPIECES, USE OF A CLINCHING TOOL, AND STEEL STRUCTURAL ELEMENT PRODUCED ACCORDINGLY

(75) Inventors: Andreas Trojer, Vienna (AT); David Krampl, Vienna (AT); Michael Matheisl, Vösendorf (AT); Richard Schütz, Vienna (AT); Thomas Novacek, Schwechat (AT); Markus Israel, Dresden (DE); Reinhard Mauermann, Dresden (DE)

(73) Assignee: Inventio AG, Hergiswil (CH)

( * ) Notice: Subject to any disclaimer, the term of this patent is extended or adjusted under 35 U.S.C. 154(b) by 483 days.

(21) Appl. No.: 12/539,960

(22) Filed: Aug. 12, 2009

(65) Prior Publication Data
US 2010/0018148 A1 Jan. 28, 2010

Related U.S. Application Data

(63) Continuation of application No. PCT/CH2008/000047, filed on Feb. 8, 2008.

(30) Foreign Application Priority Data

Feb. 13, 2007 (EP) .................................... 07102275

(51) Int. Cl.
*B21D 39/00* (2006.01)
*B21D 22/00* (2006.01)
*H01R 4/06* (2006.01)

(52) U.S. Cl.
USPC ............... 29/524.1; 29/521; 29/509; 29/514; 29/243.5; 403/274; 403/280; 403/282; 403/285; 72/347

(58) Field of Classification Search
USPC ............. 29/521, 524.1, 505, 509, 514, 243.5, 29/243.53; 403/274, 276, 279, 280, 282, 403/283, 284, 285; 72/347
See application file for complete search history.

(56) References Cited

U.S. PATENT DOCUMENTS 3,555,831 A * 1/1971 Pogonowski, I. C. ........ 405/227
4,803,767 A * 2/1989 Obrecht et al. .............. 29/243.5
(Continued)

FOREIGN PATENT DOCUMENTS

DE 39 23 182 1/1991
WO 03/015579 2/2003

OTHER PUBLICATIONS

"Die Tox-Verbindungssysteme: Die Einfachheit Ist Unsere Staerke." Internet Citation , [Online] (2003) XP002322871 Retrieved from the Internet: URL:http://www.tox-de.com> p. 2, col. 1.

*Primary Examiner* — Essama Omgba
(74) *Attorney, Agent, or Firm* — Ladas & Parry LLP (57) ABSTRACT

A method of producing a load-bearing steel construction connection, wherein a clinch connection (13) connecting a first metal workpiece (6.1, 6.2) with a second metal workpiece (6.3, 6.4) is formed by local deformation by means of a die tool (20) and a counter-tool (30). In that case initially the first metal workpiece (6.1, 6.2) and the second metal workpiece (6.3, 6.4) are placed one on the other on a processing surface of the counter-tool and aligned. The die of the die tool is then advanced and sunk into the two metal workpieces (6.1, 6.2; 6.3, 6.4) placed one on the other until the clinch connection (13) has been formed by plastic deformation. The first metal workpiece (6.1, 6.2) has a first workpiece thickness (t1) and the second metal workpiece (6.3, 6.4) has a second workpiece thickness (t2), which together give a total workpiece thickness (tt) which is thicker than 8 millimeters. The die is designed to be rotationally symmetrical with respect to its rotational axis (24) and has a conically shaped transition region (21, 22) narrowing at an angle (W, W1, W2) in the direction of sinking-in of the die.

8 Claims, 6 Drawing Sheets

(56) References Cited

U.S. PATENT DOCUMENTS

| | | | | |
|---|---|---|---|---|
| 5,305,517 A | * | 4/1994 | Schleicher | 29/798 |
| 5,528,815 A | * | 6/1996 | Webb | 29/509 |
| 5,984,563 A | * | 11/1999 | Wu | 403/282 |
| 6,205,640 B1 | * | 3/2001 | Dubugnon | 29/522.1 |
| 6,217,115 B1 | | 4/2001 | Downey et al. | |
| 6,722,013 B1 | * | 4/2004 | Rapp | 29/521 |
| 8,141,227 B2 | * | 3/2012 | Nishimura et al. | 29/524.1 |
| 2004/0143948 A1 | * | 7/2004 | Rapp | 29/283.5 |
| 2004/0168297 A1 | | 9/2004 | Nishimura | |
| 2005/0229378 A1 | * | 10/2005 | Dietrich et al. | 29/514 |
| 2006/0096075 A1 | | 5/2006 | Robinson et al. | |

* cited by examiner

METHOD FOR CLINCHING THICK METAL WORKPIECES, USE OF A CLINCHING TOOL, AND STEEL STRUCTURAL ELEMENT PRODUCED ACCORDINGLY

This is a continuation of copending International Application CH2008/000047 filed on Feb. 8, 2008, which designated the U.S., claims the benefit thereof and incorporates the same by reference.

BACKGROUND OF THE INVENTION

The invention relates to the clinching of thick metal workpieces for producing load- bearing clinch connections, the use of corresponding clinch connections in steel construction, as well as correspondingly produced steel construction elements, particularly for use in escalators, moving walkways or lift installations.

Clinching is a deformation joining method already known for a long time. This method is also termed penetration joining. Clinching is a deformation-based connecting technology which depending on the respective form of embodiment manages without any auxiliary joining component.

For clinching there are different variants with respect to production of the joining element. Characterization of clinching is possible in accordance with the following:
- according to the joining element construction: clinching with and without a cutting component;
- according to the matrix shape: solid and open matrices
- according to the tool kinematics: single-step and multi-step clinching.

In the following the primary concern is clinching without a cutting component. This method has certain advantages relative to the conventional method used for connecting plates or other workpieces, such as, for example, welding, spot-welding, connecting by means of rivets or blind rivets and use of punch rivets. By comparison with conventional connecting methods, clinching without a cutting component is more advantageous when the costs per connection are taken into consideration.

The clinching of plates and other metal workpieces thicker than 4 millimeters is known from US 2006/0096075 A1. As was established within the scope of the present invention, however, the clamping forces in this known method are very high, which on withdrawal of the die can lead to damage of the plates or metal workpieces.

BRIEF SUMMARY OF THE INVENTION

The object of the invention is to provide a method for clinching plates and girders of thick plates, preferably with thicknesses greater than 4 millimeters, with low clamping forces so as to be able to reliably use clinching in the future even in steel element construction where it is important that the corresponding parts can be loaded with greater moments and forces. Stated in other words, the clinching shall be made usable for stress-bearing and load-bearing as well as supporting metal workpieces. In that case thick metal workpieces shall be so connected together that an optimum undercut stamping and a largest possible neck thickness are achieved so as to ensure a corresponding strength of the clinch connection.

In addition, correspondingly optimized uses of the clinching and a correspondingly produced steel construction element shall be proposed.

Fulfillment of the object takes place by the use of a die with a pair of different flank angle transition regions.

Advantageous examples of embodiment and developments of the invention are circumscribed or defined by the respective dependent patent claims.

According to the invention it is possible to clinch steel plates and steel girders or steel profile members (here generally termed metal workpieces) by lower clamping forces and thus reliably produce stable and load-bearing steel construction elements, wherein the metal workpieces together have a total workpiece thickness (tt) thicker or greater than 8 millimeters.

Steel components of sufficient load-bearing capability and stability can be reliably produced only with the correspondingly thick metal workpieces and the clinching method according to the invention.

In order to make this possible the clinching tools were appropriately developed and optimized. The tools according to the invention are distinguished by the fact that they have a conically shaped die with two transition regions, wherein the transition region in the area of the end surface has a greater angle than the upper transition region connected therewith the greater flank angle can be smaller than or equal to 10 degrees and go over into a flank angle of from 5 degrees to zero degrees. The diameter of this die preferably lies in the range between 10 millimeters and 35 millimeters. Particularly preferred are diameters between 12 millimeters (14 millimeters, 16 millimeters, 18 millimeters) to 20 millimeters or 25 millimeters, wherein this diameter depends on the thickness of the metal workpieces to be connected and on the required strength or tensile force.

Through the present invention, clinching is a real alternative to welding, which hitherto was mostly used as the joining method for connecting thicker workpieces (for example St-37, St-44, St-52, St-70 plate or EN-S235, S275, S355, S460 plate) or girders (thickness >4 millimeters). However, the clinching can also replace rivet and screw connections.

According to the invention, plates, profile members and other metal components or metal workpieces of different thickness and different materials can be connected together. The connection of two metal workpieces comes about exclusively in the clinching and directly from the material or materials of the metal workpieces to be connected. The elements connected by clinching are here termed clinched steel construction element.

The present invention now makes it possible to also use metal workpiece connections, for example connections on steel girders with plate profile members, plate parts or plate strips to increasing extent in lift and escalator construction, wherein, inter alia, a part of the lift cage or of the framework or supporting structure of an escalator can be produced by means of clinching technique.

However, various load-bearing attachment parts can be fastened by means of clinching technology, for example to a load-bearing or supporting framework, structure, bracket, sculpture, chassis or frames. Thus, for example, plate claddings (panels) can be mounted by means of clinching.

A non-detachable connection of two metal workpieces, which in addition achieves substantial holding forces (tensile forces and shear forces), is created by the present invention. Under dynamic loading it emerges that the thus-produced clinched steel construction elements have a significantly better load-bearing behavior than spot-welded connections.

Both coated and uncoated materials can be connected together without problems in accordance with the invention, which opens up new possibilities of material selection particularly in lift and escalator construction. Thus, for example, plated, painted or plastic-coated plates and/or steel girders can be connected together without the coating suffering noticeable damage due to the clinching. The metal components or metal workpieces can also be provided with an anti-corrosion coating before they are joined together by clinching to form a larger steel construction element.

A further advantage of the clinching is that for producing the connection neither preliminary aperturing operations nor auxiliary joining parts, connecting parts or connecting material are needed. The principal advantage of clinching relative to conventional methods is, however, the low joining costs. Moreover, no heat intake or heat induction into the workpieces to be connected takes place, so that distortion, fusion and structural changes are avoided, which, for example, is particularly advantageous in large and long steel construction elements, such as a support structure, framework, shaping frame, safety frame, support frame and carrier structure.

BRIEF DESCRIPTION OF THE SEVERAL VIEWS OF THE DRAWINGS

Further details and advantages of the invention are described in the following on the basis of an example of embodiment and with reference to the drawing, in which.

DETAILED DESCRIPTION OF THE INVENTION

The scope of the present patent application, as already indicated in the introduction, concerns clinching without a cutting component. This form of clinching is a pure deformation joining process. Connecting of the workpieces is realized merely by penetration in conjunction with recessing and subsequent upsetting. The underlying principle in the development of this method without a cutting component is primarily the desire for increased connection stiffness as a consequence of greater material confinement.

Figure 1:
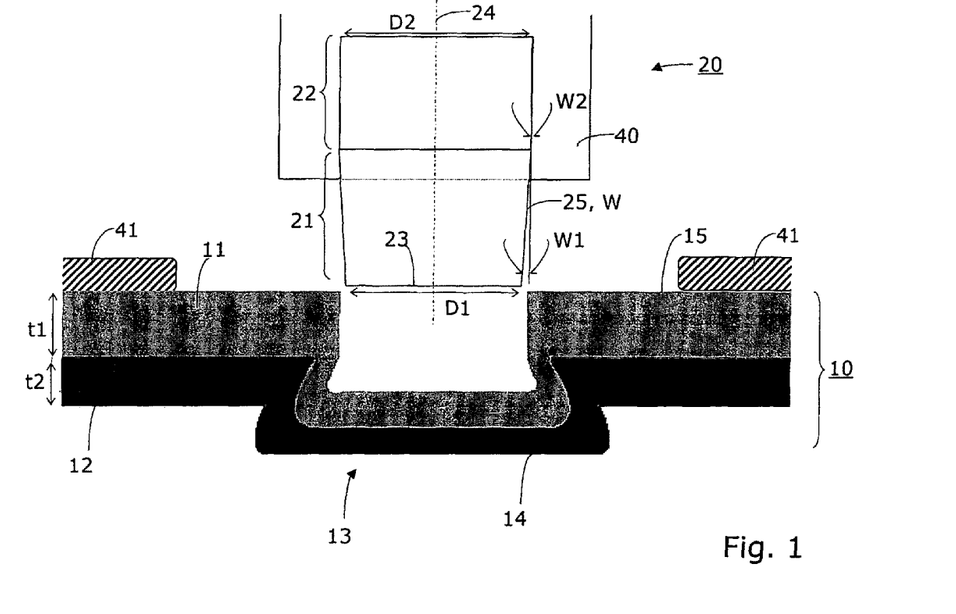
FIG. 1 shows the die of a clinching tool and two metal workpieces connected together by clinching, in a substantially simplified schematic illustration.

The principle of the invention is illustrated in FIG. 1 purely schematically. Two metal workpieces 11 and 12 which were connected together by a clinch connection 13 are shown. A part of the die tool 20, which is here termed die, is shown above the clinch connection 10 or the clinching point 10.

Figure 2A:
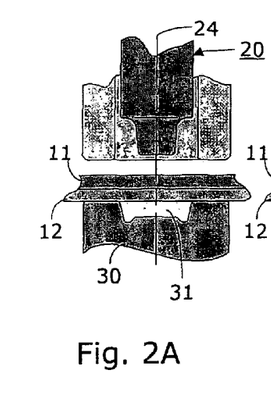
FIG. 2A shows a first step of clinching according to the invention, in a schematic illustration, wherein the two transition regions of the die are not illustrated.
Figures 2B, 2C:
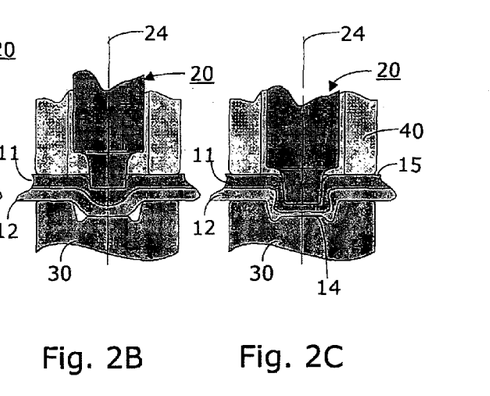
FIG. 2B shows a second step of clinching according to the invention, in a schematic illustration, wherein the two transition regions of the die are not illustrated.
FIG. 2C shows a third step of clinching according to the invention, in a schematic illustration, wherein the two transition regions of the die are not illustrated.

The clinching tool 20 comprises a die and a counter-tool 30 which can be constructed as a matrix or anvil. The die is designed to be rotationally symmetrical with respect to its rotational axis 24. The die has a flank 25, which is arranged concentrically with respect to the rotational axis 24, with a flank angle W. With respect to a terminal front end surface 23 of the die distinction is to be made, in the case of the flank 25, between a lower transition region 21, which adjoins the front end surface 23, of the flank 25 with a flank angle W1 and an upper transition region 22, with a flank angle W2, of the flank 25. The two transition regions 21, 22 merge into one another. In that case they can, as shown in the examples of embodiment according to FIGS. 1, 3B and 5A, merge into one another in non-continuous mode and manner and have different flank angles W1, W2. The metal workpieces 11, 12 to be connected (for example, a steel girder with thickness t1 and plate with thickness t2, wherein t1>t2), are pressed by the die, similarly to stamping or upsetting, under plastic deformation into a depression, recess, cavity or deformation space 31 of the matrix 30, as shown in FIGS. 2A to 2C. A clinch connection 13, which has a shape similar to a pushbutton, a compression point or a stamping point, arises by virtue of a special form of the depression, recess, cavity or deformation space 31. The clinch connection 13 connects the metal workpieces 11, 12 together in shape-locking and force-locking manner, as schematically indicated in FIG. 1, FIG. 2C, FIG. 3A and FIG. 4.

FIGS. 2A to 2C show, in three stages, the construction of the clinch connection 13 without cutting component and with a solid matrix 30. The two metal workpieces 11, 12 are, for the sake of simplicity, illustrated with the same thickness in FIGS. 2A to 2C.

In FIG. 2A it can be seen that the first metal workpiece 11 and the second metal workpiece 12 are joined together, i.e. positioned one on the other. The two metal workpieces 11, 12 placed one on the other are then aligned relative to one another, for example by means of a template, and then provided together on a processing surface of the matrix 30 serving as counter-tool. In FIG. 2B it is shown how the die of the die tool 20 is advanced and was already partly sunk into the workpieces 11 and 12. The workpieces 11 and 12 deform under the high pressure of the die and the material 'flows' into the recess, cavity, deformation space or depression 31 of the matrix 30. The sinking-in or pressing-in of the die is carried out until the underside 14 of the second metal workpiece 12 substantially bears against the base of the recess, cavity, deformation space or depression 31 of the matrix 30. In a further step the die is then withdrawn (this step substantially corresponds with the situation shown in FIG. 1).

According to the invention use is preferably made, during separation, of a stripper or holding-down device 40 which facilitates separation of the die after deformation of the metal workpieces 11 and 12. Such a stripper or holding-down device 40 is particularly advantageous when the die, due to the forces and material deformations arising during deforming, might jam in the clinch connection 13. The stripper 40 is (quasi) supported relative to the surface 15 of the upper metal workpiece 11 at the die side whilst the die is retracted or drawn back. With knowledge of the present invention the expert can obviously also realize a stripper at the matrix side instead of a stripper at the die side.

The metal workpieces 11 and 12 to be connected are preferably urged towards or against the matrix 30 by a holding-down device which is characterized in FIG. 1 by the number 41 or 40. The die tool 20 comprises a pressure cylinder (for example a hydraulic cylinder, compressed gas cylinder, hydropneumatic cylinder, servo-electric cylinder) which produces the so-called die forward stroke in the direction of the metal workpiece 11 and subsequently the workpiece 12. In a first phase of the die forward stroke the die is advanced (FIG. 2A), then the recessing phase takes place in which the die is sunk into the metal workpieces 11, 12 and these are upset and deformed (FIGS. 2B and 2C). A phase termed die return stroke finally takes place (see FIG. 1). The (partly) finished or connected or joined steel construction element can then be removed or further clinch connections can be formed.

Figure 3A:
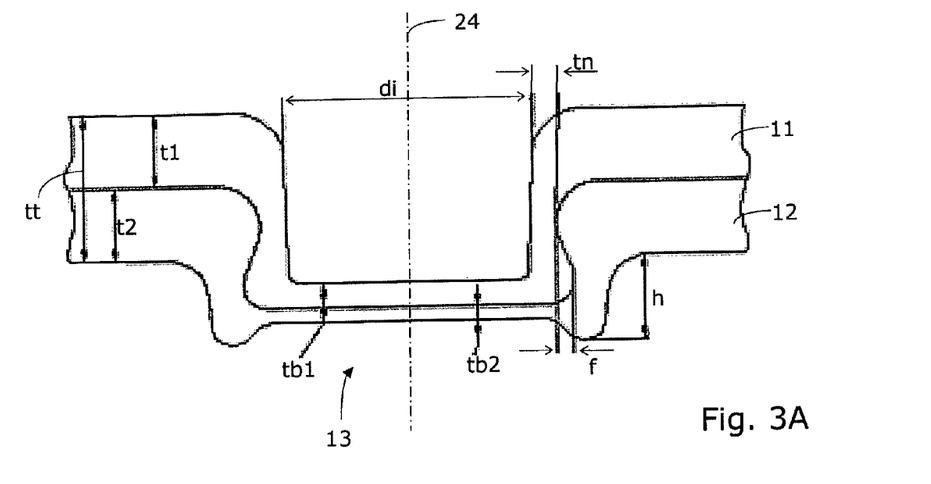
FIG. 3A shows a section through two clinched metal workpieces.
Figure 3B:
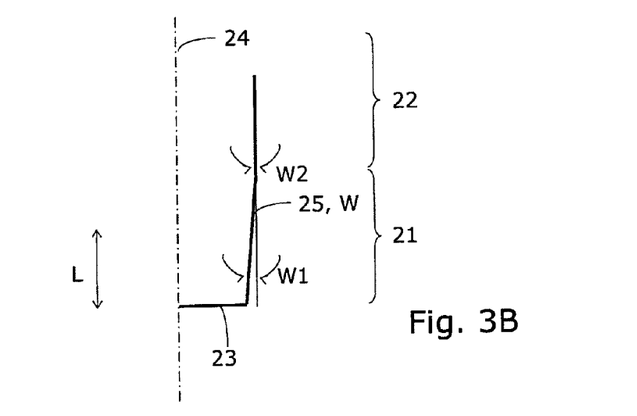
FIG. 3B shows a part section or detail of a region of the clinching tool according to the invention.

As a consequence of the upsetting pressure during the recessing a transverse flow of the material of the metal workpieces 11 and 12 occurs, whereby the matrix 30 with the depression recess, cavity or deformation space 31, for example in the form of a (machined) annular groove, is substantially or entirely filled up and an undercut f of the metal workpiece 11 at the die side is produced in the metal workpiece 12 at the matrix side (see FIG. 3A). Undercut f and neck thickness tn are the most important or most significant for assessing a clinch connection 13, as shown in FIG. 3A, since the load-bearing capability of the clinch connection 13 is in direct correlation with these variables. These two characteristic magnitudes are very important for the stability and strength of the steel construction element according to the invention. A typical value for the undercut f is 0.5 millimeters and a typical value for the neck thickness tn is 1.5 millimeters.

A clinch connection 13 and the workpieces 11 and 12 can additionally be characterized by the following particulars: inner diameter di of the joining element or die, protrusion height h, residual base thickness tb2 of the metal workpiece 12 at the matrix side, residual base thickness tb1 of the metal workpiece 11 at the die side, metal workpiece thickness t2 at the matrix side, metal workpiece thickness t1 at the die side and total workpiece thickness tt.

Different tests and experiments were undertaken in order to optimize the clinching process, which is known per se, and so modify it so as to also be possible to clinch metal workpieces 11, 12 thicker than 4 millimeters to form a steel construction element without excessively high clamping forces occurring. Simulations were undertaken and subsequently different tools produced and joining tests conducted in order to be able to compare the determined (in the experiment) cross-sections, joining forces and holding-down forces with the reference based on the simulation. Tool design principles for clinching without a cutting component and with a solid matrix 30 served as the basis for the tests with respect to tool design.

First tests yielded the result that for the production of a clinch connection 13 for a small die diameter (diameter D2=12 millimeters or 14 millimeters) joining forces of approximately 400 kN to 510 kN have to be used and for the larger die diameter (D2=20 millimeters) joining forces of approximately 670 kN have to be used (both inclusive of holding-down force). These results in themselves lie in the region of the anticipated outcome (however, notwithstanding tool lubrication a high level of jamming of the die in the workpiece occurred).

More precise tests with respect to the jamming of the die have shown that the jamming is caused by a radial stress acting on the flank of the die. It has proved that excessive radial stresses arise particularly in the upper transition region 22 of the flank 25.

In a further optimization step the geometry of the die was now selectively changed in such a manner that a lower radial stress acted on the flank 25. Due to the fact that in the first tool variants the value for the neck thicknesses tn and the value for the undercut f of the die with the diameters D2=12 millimeters and D2=14 millimeters were almost the same, further optimizations were undertaken. Tests were in that case also made on workpieces with different overall workpiece thicknesses tt and with workpieces 11, 12 having different thicknesses t1, t2. In that case it has proved that commercially available or conventional dies not only exhibit a strong tendency to jamming if there is progress to total workpiece thicknesses tt>8 millimeters, but that a cavity (see X in FIG. 4C) forms in the region between the workpieces 11, 12. This cavity X prejudices and reduces the strength of the corresponding clinch connection 13 as well as the stability of the entire steel construction element.

The various optimization steps have led to the recognition that the design of the flanks of the die has a direct influence on the jamming and the formation of the cavity X. In order to reduce or entirely eliminate these two negative effects dies were developed and tested which are shaped conically at least in part. With suitable selection of the corresponding flank angle W, W1, the jamming could be reduced or entirely prevented without leading to a detectable cavity formation. It is proved that these two effects are correlated only in part and are even mutually contradictory in part. Through the selection of a suitable angle range the two effects could be minimized. Thus, the basis for the thick plate clinching of stable steel construction elements by clinch connections 13 was established.

In the tests shown in FIGS. 4A to 4C and described in the following the die according to the invention has in each instance a constant die flank angle W=5°, i.e. D1<D2, or, stated in other words, at least that part of the die coming into contact with the workpieces 11 and 12 during recessing narrows in downward direction (i.e. in the direction of the end of the die at the workpiece side).

Figure 4A:
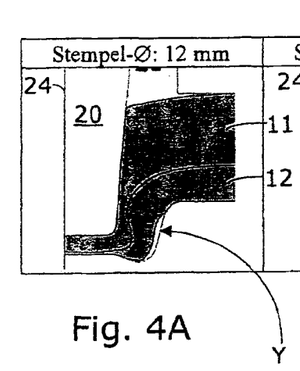
FIG. 4A shows a section showing two clinched metal workpieces or metal components and a part of the clinching tool (not according to the invention), wherein the die of the clinching tool has a diameter of 12 millimeters.
Figures 4B, 4C:
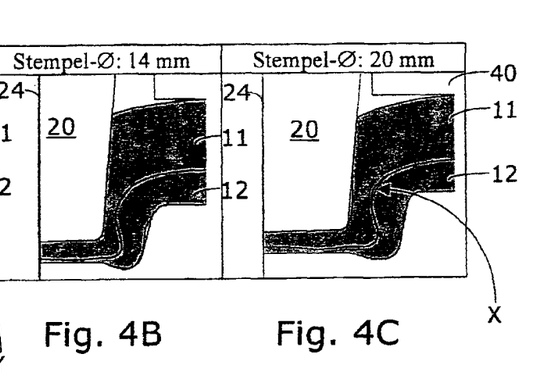
FIG. 4B shows a section showing two clinched metal workpieces and a part of the clinching tool (not according to the invention), wherein the die of the clinching tool has a diameter of 14 millimeters.
FIG. 4C shows a section showing two clinched metal workpieces and a part of the clinching tool (not according to the invention), wherein the die of the clinching tool has a diameter of 20 millimeters.

Some aspects of the different tests are illustrated in FIGS. 4A to 4C, because they are applicable in analogous manner to the die according to the invention. The flow behavior of the workpieces 11, 12 in the case of use of dies with different diameters is shown. In FIG. 4A it is shown how the two metal workpieces 11, 12 deform when the die has a diameter of 12 millimeters. In FIG. 4B it is shown how the two metal workpieces 11, 12 deform when the die has a diameter 14 millimeters. FIG. 4C shows how the two metal workpieces 11, 12 deform when the die has a diameter of 20 millimeters. In all three illustrations there is use of a snapshot shown before the die return stroke.

It can be seen on the basis of FIGS. 4A to 4C that the diameter D2 of the die has an influence on the transverse flow of the materials or metal workpieces. In the case of the die with 12 millimeter diameter the material of the metal workpiece 12 does not flow entirely into the cavity formed by the depression or recess 31, as can be seen in the region marked by Y. In the case of a 14 millimeter die a good 'filling' of the depression or recess 31 results. If use is made of a die with 20 millimeter diameter, then a cavity (denoted by X in FIG. 4C) appears between the workpieces 11 and 12.

As the diverse experiments and researches have shown, the die diameter is only one of various parameters having a direct influence on the clinching process and the strength of the clinch connection 13. It has proved that for the clinching of thicker workpieces with tt>8 millimeters, the design of the flank 25 has a particularly important and significant role.

The present invention is accordingly distinguished by the fact that the die, which is sunk into the metal workpieces 11 and 12 during the deforming, is conically shaped. The conical shape of the die extends at least over a part (termed transition regions 21, 22) of that length L of the die which is sunk or pressed into the workpieces 11, 12. The conical shape results due to the fact that the flank 25 of the die—see FIG. 3B—is conically shaped at least in the lower transition region 21 to the front end surface 23 and has a flank angle W1 which is smaller than or equal to 10 degrees, preferably smaller than or equal to 5 degrees. As further shown in FIGS. 1 and 5A, the flank angle W2 of the upper transition region 22 is preferably equal to zero degrees or similarly preferably smaller than or equal to 5 degrees (examples of embodiment according to FIGS. 4A to 4C as well as 5B).

Dies have proved particularly satisfactory with a diameter D2 between 10 millimeters and 20 millimeters and with a flank angle W1, W2 going over from a first angle W1 to a second angle W2, wherein the first angle W1 is smaller than or equal to 10 degrees and preferably smaller than or equal to 5 degrees and the second angle W2 is smaller than or equal to 2 degrees, and preferably 0 to 1 degrees. In that case the first angle W1 is located in the immediate (lower) transition region 21 to the front end surface 23 (i.e. in the region of the end of the die at the workpiece side) and the second angle W2 on the (upper) transition region 22 going away, extending out or projecting from the metal workpiece 11, 12 (i.e. in the region of the die at the tool side).

This construction of conical dies exhibits a significantly lesser tendency to jamming and no (or only poorly pronounced) cavities X form. The advantage of the lower radial stress and thus the lesser tendency to jamming are, however, 'paid for' by the creation of the cavity X between the metal workpieces 11, 12, i.e. the flank angle W, W1, W2 cannot be selected arbitrarily, since otherwise the cavity X would be too large and the strength of the clinch connection too small.

Forms of construction of the die are ideal in which the flank recessing or flank reduction produced by the flank angle is not too large, since in the case of a too-large flank recessing or flank reduction the radially directed pressure on the workpieces 11, 12 is too small and the transverse flow of the materials or of the metal workpieces thus reduces.

The indicated angle values for W, W1, W2 have also proved satisfactory because the clinch connections produced by these dies have values for the neck thickness tn and the undercut f similar to and comparable with the commercially available, conventional purely cylindrical thin-sheet die. This means a comparable, identical tensile strength of the corresponding clinch connection 13.

The conical shape of the die extends at least over the transition regions 21, 22 with that length L of the die which is sunk into the workpieces 11, 12. This length L in the case of metal workpieces having an overall workpiece thickness tt>8 millimeters can be determined as follows: $0.3\,tt \leq L \leq 2\,ft$, i.e. the conically shaped transition regions 21, 22 correspond with between three tenths of the total workpiece thickness tt and twice the workpiece thickness tt.

Figure 5A:
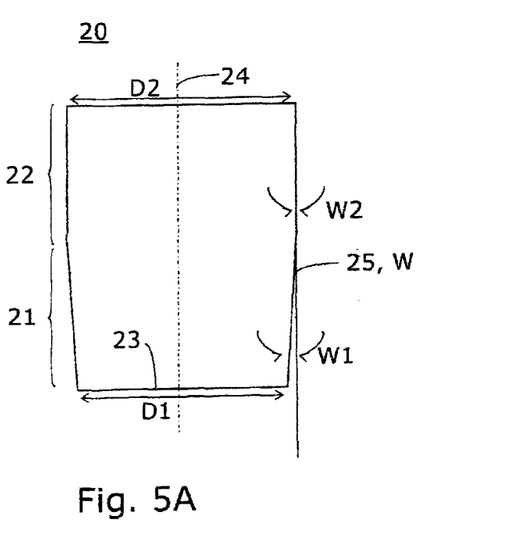
FIG. 5A shows a section through a schematically illustrated die according to the invention.

The different die shapes according to the invention are summarily explained in the following by way of FIGS. 1 and 5A.

| Form of embodiment | 1 | 2 |
|---|---|---|
| Fig. | 1 | 6A |
| Typical diameter | D1 < D2 and 10 mm ≤ D2 ≤ 30 mm | D1 < D2 and 10mm ≤ D2 ≤ 30 mm |
| Length L of the transition regions 21, 22 | 0.3 tt ≤ L ≤ 2 tt | 0.3 tt ≤ L ≤ 2 tt |
| Angle | W1 ≤ 10 degrees in the lower transition region 21 and W2 = 0 in the upper transition region 22 | W1 ≤ 10 degrees in the lower transition region 21 and 0 degrees ≤ W2 in the upper transition region 22, wherein W > W2 |

The attained strengths, which are achieved with the die according to the invention, for example with a die with 12 millimeter diameter and a 5° to 0° die flank (form of embodiment 2, FIG. 6A), is on the average more than 50 kN or 55 kN. In the case of particularly carefully selected conditions the tensile force even lies at approximately 58 kN with a slight tolerance of only a few percent.

Two criteria are to be taken into consideration for the stripping (stripper) force design of the stripper 40. On the one hand the stripping force or stripper force has to be larger than the jamming force of the die. This value is naturally strongly dependent on the die geometry employed, as was described, but also on the lubrication or coating of the tools. Maximum ejection forces of 30 kN to 40 kN have led to very reliable results. In an optimum design of the flank angle W or the conicity of the die, ejection forces attain 25 kN. A further reduction in ejection force can even be taken into account for the 5° to 0° die (form of embodiment 2, FIG. 5A), since jamming of the die never occurs here.

In a particularly advantageous form of embodiment the stripper 40 also functions at the same time as a holding-down device (41) and is dimensioned so that the metal workpieces 11, 12 experience a smallest possible deformation in order to keep the distortion of the workpieces 11, 12 as small as possible or keep them free of distortion.

Particularly stable and load-bearing steel construction elements can be produced in a mode and manner which are as simple, trouble-free, economic and reliable as possible by the dies according to the invention and the clinching tools or clinching machines which have or possess the corresponding dies. The costs for these steel construction elements with clinch connections 13 lie below those of welded, riveted or screwed connections. The composite material costs for steel construction elements with clinch connections 13 are zero. Moreover, the working time is restricted to a minimum.

Figure 6:
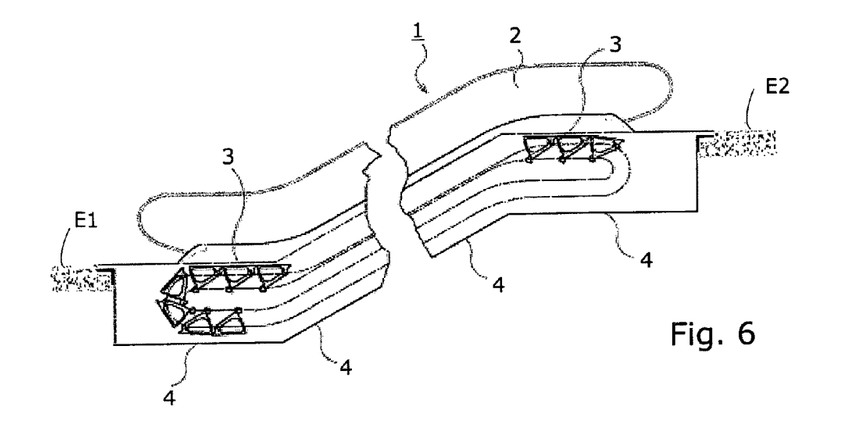
FIG. 6 shows a side view of an escalator or a moving walkway with the framework or support structure.

An escalator 1 is shown in FIG. 6 in a side view. The escalator 1 comprises a balustrade 2 with encircling handrail and an endless chain with tread steps or steps 3. Typically arranged below the balustrade 2 of the escalator or moving walkway is a steel construction 4 which is so constructed that it bridges over the intermediate space or the support width between two floors E1 and E2 and carries the elements, components or subassemblies of the escalator 1 or the moving walkway.

Figure 7:
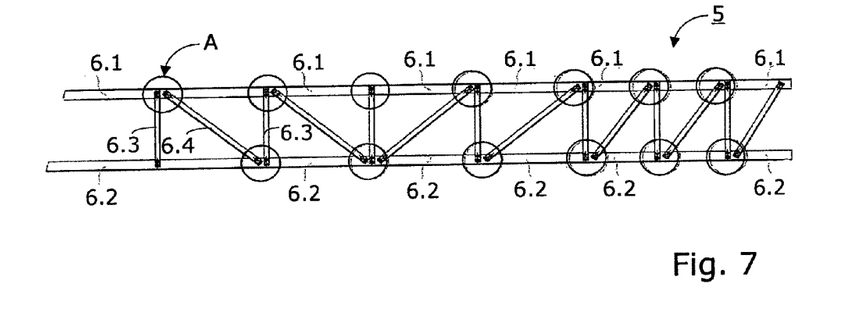
FIG. 7 shows a side view of a part of a framework with double clinch connections, according to the invention.

This steel construction 4 has to satisfy the highest demands and is therefore costly and complicated in production. According to the invention use is now made of framework steel construction elements or framework support elements 5 as shown in FIG. 7. Such a framework steel element or framework element 5 can comprise two steel girders or profile girders 6.1 and 6.2 extending in longitudinal direction. Particularly preferred are steel beams with an L, I or U profile, as well as tubes or shaped tubes. These two steel girders 6.1, 6.2 are connected together by a number of flat plates or iron sheets or by a number of plate profile members or steel profile members 6.3, 6.4. The flat plates or iron sheets or the plate profile members or steel profile members 6.3, 6.4 are, according to the invention, fastened to each of these steel girders or profile girders 6.1 and 6.2 by means of one, two, three or more clinch connections 13 and thus form a stable framework frame, framework support wall or framework support element.

As can be seen in FIG. 7, the flat sheets or iron sheets or the steel profile members or plate profile members are typically so arranged that in each instance in alternation a vertical stay or strut 6.3 follows an inclined strut or diagonal 6.4. The clinch connections 13 are indicated in FIG. 7 by circles "A".

Figure 8A:
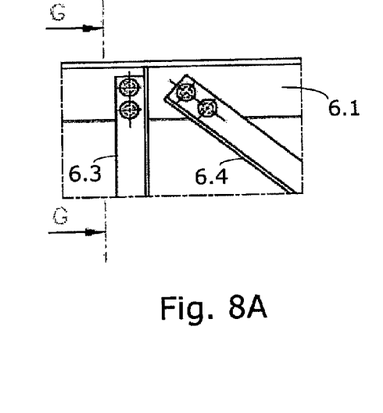
FIG. 8A shows a part view of the framework with double clinch connections, according to the invention.
Figure 8B:
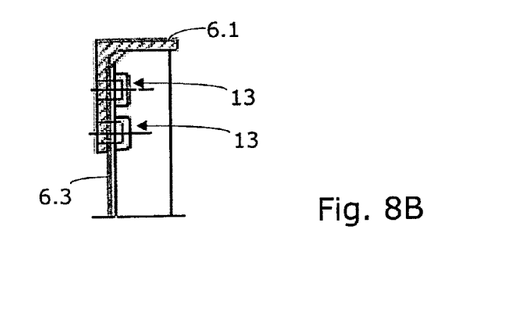
FIG. 8B shows a section G-G through the double clinch connections, according to the invention.

Details of a steel construction element 5 according to the invention are shown in FIGS. 8A and 8B. One of the steel girders 6.1 and two of the flat plates or iron sheets or the sheet profile members or steel profile members 6.3, 6.4 can be seen. In the illustrated example the steel girder 6.1 is an L-girder or angle member with a material thickness t1>4 millimeters and the struts or the stays and diagonals are angled plate profile members, iron sheets, steel profile members or steel construction profile members 6.3, 6.4 with a material thickness t2 greater than or equal to 3 millimeters. A section through two clinch connections 13 arranged adjacent to one another can be seen in FIG. 8B. The corresponding connection is also termed double clinch connection.

According to the invention steel construction elements are regarded as particularly advantageous which connect together metal workpieces of different thickness (for example, the longitudinal girders or profile girders 6.1 and the plate profile members or steel profile members or steel construction profile members 6.3, 6.4), wherein the clinch connections 13 are preferably applied from the thicker workpiece side, i.e. the die of the clinching tool is sunk in from the side of the thicker metal workpiece and the clinch connection forms on the opposite side (see FIG. 8B). Stated in other words, clinch connections are preferred in which the thicker material is reshaped by local deformation in the thinner material through transverse flow to form a fixed connection.

Figure 8C:
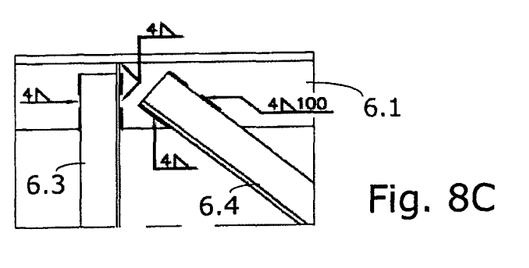
FIG. 8C shows a part view of a framework with weld connections, according to the state of the art.

In FIG. 8C there is shown, for comparison, a part of a framework or framework support frame of which the workpieces 6.1, 6.3, 0.64 are welded together by means of five or six weld connections. It is obvious that such weld connections are costly to produce.

Figure 9:
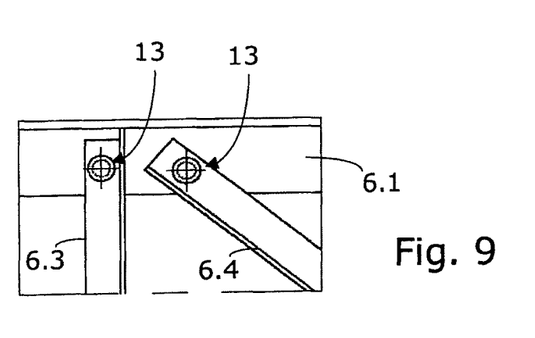
FIG. 9 shows a part view of a further framework with single clinch connection, according to the invention.

A further form of embodiment of the invention is shown in FIG. 9. Here use is made of single clinch connection 13 in order to produce a steel construction element. The corresponding connection is termed single clinch connection.

Figure 10:
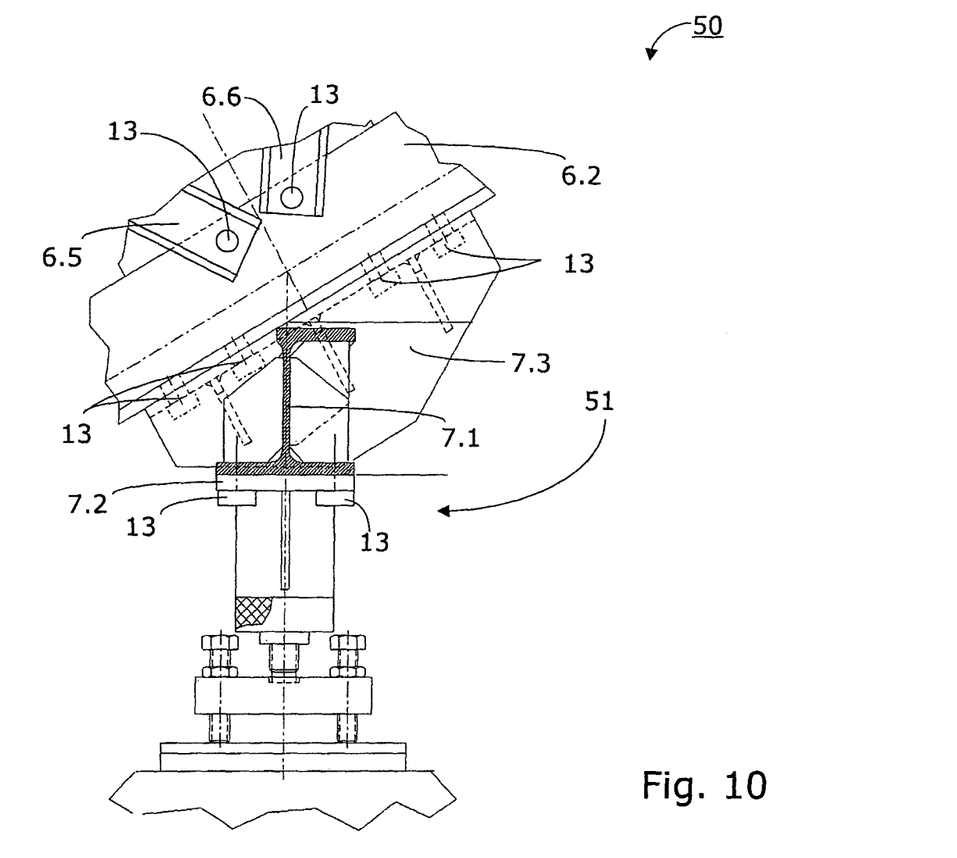
FIG. 10 shows a part view of a centre support for a framework with clinch connections, according to the invention.

A further form of embodiment of invention is shown in FIG. 10. Here use is again made of clinch connections 13 in order to, for example, create a (middle or centre) support 51 in steel mode of construction. This (middle or centre) support 51 can be part of a steel construction element 50, 5 for use in moving walkway construction or escalator construction. A steel profile member 7.1 rests, as schematically illustrated, on a lower steel profile member 7.2. The two steel profile members are connected together by clinch connections 13. In addition, 7.1 and 7.3 can also be clinched with 6.2 and have one clinch connection or a few clinch connections 13. A longitudinal girder or profile girder 6.2 rests on the steel profile member 7.1. Several flat plates or iron sheets or several plate profile members or steel profile members 6.5, 6.6 are fastened to this longitudinal girder or profile girder 6.2 by clinch connections 13.

According to the invention steel construction elements can also be constructed which are part of a lift installation. Thus, for example, the first metal workpiece 11 can be a supporting or carrying element or a fixing element of a lift cage. The second metal workpiece 12 is then a flat plate or iron sheet or a plate profile member or steel profile member, which is fastened to the supporting or carrying element or fixing element by means of one, two, three or more clinch connections 13. Thus, for example, the frame or the safety frame of a lift cage can be constructed from stable steel girders 11 having several struts of sheet metal or steel sections. These struts are fixedly clinched to the steel girders. In addition, the winch trellis, drive trellis, drive beam, engine stand, winch frame or engine frame can be clinched with steel profile members or plates.

The first metal workpiece 11 can, however, also be a support or frame element of a counterweight, counterweight frame or counterweight basket of a lift installation. In this case the second metal workpiece 12 is a flat plate or iron sheet or a plate profile member or steel profile member fastened to the support or frame element by means of one, two, three or more clinch connections 13.

It is also possible with the die tool 20 according to the invention to form two clinch connections 13 adjacent to one another (see FIG. 8A and FIG. 8B) in order to further increase the tensile strength and shear strength. In this case it has proved that the tensile strength could be increased to values which are almost twice as large by comparison with a single clinch connection 13. The samples could be loaded on average with approximately 118 kN.

A particularly advantageous clinching tool 20 comprises two identical dies which are arranged adjacent to one another and which are capable of connecting the first metal workpiece 11 with the second metal workpiece 12 by two clinch connections. Here, two clinch connections adjacent to one another are produced simultaneously by an advance movement and a recessing movement. The example of a corresponding double clinch connection is shown in FIGS. 8A and 8B. It can be seen in the illustrated example that according to the invention, for example, a thicker steel profile member girder 11, 6.1 (first metal workpiece) can be connected with a thinner plate, iron sheet, steel profile member or plate profile member 12, 6.3, 6.4 (second metal workpiece) by two clinch connections 13 adjacent to one another.

According to the invention clinch connections 13 can also be produced, without a cutting component, by open matrices. In that case resiliently mounted plates of the matrices are urged outwardly after the recessing process by the radial flow of the workpiece material below the die and thus enable formation of the undercut.

Apart from the advantages of conventional clinching, matrix-free clinching can also be used, which has the following advantages by virtue of its special principle of function:

An offset between (joining) die and counter-tool (anvil) does not impair the quality of the connection 13. The demands on accuracy for the joining machine thereby are not diminished.

Time-consuming setting up operations can be eliminated.

Wear reduces and processing reliability increases, since break-outs at the matrix edge can no longer occur.

The same anvil can be used for all joining tasks. A change of matrix in the case of change of joining task, as in the case of conventional clinching, is no longer necessary.

The joint connections 13 are flatter and less disruptive than the connections produced by conventional clinching.

A change in the sheet thickness is possible without tool change and saves valuable working time.

A change in the material pairing takes place without outlay.

Matrix-free clinching increases the number of clinch connections or joining points per tool set or per (joining) die.

The invention claimed is:

1. A method of producing a load-bearing steel construction connection, wherein a clinch connection connecting a first metal workpiece with a second metal workpiece is formed by local deformation by means of a die tool and a counter-tool, comprising the steps of:

placing one of the first or second metal workpieces on the other and aligning the first metal workpiece and the second metal workpiece on a processing surface of the counter-tool;

advancing a die of the die tool;

sinking the die into the two metal workpieces which are placed one on the other until the clinch connection is formed by local deformation; and withdrawing the die;

wherein the first metal workpiece has a first workpiece thickness and the second metal workpiece has a second workpiece thickness which together give a total workpiece thickness thicker than 8 millimeters, characterized in that the die is rotationally symmetrical with respect to a rotational axis and has at least two conically shaped transition regions with a length L wherein $0.3\,tt < L < tt$, tt being a total workpiece thickness and L is shorter and smaller than tt which narrow at a flank angle in the direction of sinking in of the die, and the flank angle has a first angle portion of a lower transition region which leads into an end surface, and a second angle portion of an upper transition region, wherein the first angle is greater than the second angle, both first and second angle portions of the flank angle being greater than zero degrees, and that during the sinking the die upper transition region is at least partly sunk into the metal workpieces.

2. The method according to claim 1, wherein a steel profile member, steel girder, steel plate, shaped tube, stainless-steel, aluminum or copper plate or steel plate profile member is used as first metal workpiece and a steel plate, steel profile member, shaped tube, stainless-steel, aluminum or copper plate or steel plate profile member is used as second metal workpiece.

3. The method according to claim 2, characterized in that the first workpiece thickness is greater than the second workpiece thickness and wherein the first workpiece thickness is greater than or equal to 4 millimeters or the second workpiece thickness is greater than or equal to 3 millimeters.

4. The method according to claim 1, characterized in that the die has a diameter between 10 and 35 millimeters for a total workpiece thickness thicker than 8 millimeters, wherein the diameter lies between 12 and 25 millimeters inclusive.

5. The method according to claim 1, characterized in that a stripper is used on withdrawal of the die so as to enable separation after clinching of the metal workpieces.

6. The method according to claim 5, characterized in that the stripper is advanced towards a surface of the first metal workpiece prior to the separation and that during the separation a separating force is exerted relative to the metal workpieces by means of the stripper while a return stroke force acting in an opposite direction draws the die back, wherein the separating force is less than 45 kN for a total workpiece thickness thicker than 8 millimeters.

7. The method according to claim 1, characterized in that two identical dies arranged adjacent to one another are used simultaneously and the first metal workpiece is connected with the second metal workpiece by two adjacent clinch connections after the sinking in and withdrawal of the dies.

8. A method of producing a load-bearing steel construction connection, wherein a clinch connection connecting a first metal workpiece with a second metal workpiece is formed by local deformation by means of a die tool and a counter-tool, comprising the steps of:

placing one of the first or second metal workpieces on the other and aligning the first metal workpiece and the second metal workpiece on a processing surface of the counter-tool;

advancing a die of the die tool;

sinking the die into the two metal workpieces which are placed one on the other until the clinch connection is formed by local deformation; and withdrawing the die by use of a stripper so as to enable separation after clinching of the metal workpieces such that the stripper is advanced towards a surface of the first metal workpiece prior to the separation and that during the separation a separating force is exerted relative to the metal workpieces by means of the stripper while a return stroke force acting in an opposite direction draws the die back, wherein the separating force is less than 45 kN for a total workpiece thickness thicker than 8 millimeters, wherein the first metal workpiece has a first workpiece thickness and the second metal workpiece has a second workpiece thickness which together give a total workpiece thickness thicker than 8 millimeters, characterized in that the die is rotationally symmetrical with respect to a rotational axis and has at least two conically shaped transition regions which narrow at a flank angle in the direction of sinking in of the die, and the flank angle has a first angle portion of a lower transition region which leads into an end surface, and a second angle portion of an upper transition region, wherein the first angle is greater than the second angle, both first and second angle portions of the flank angle being greater than zero degrees, and that during the sinking the die upper transition region is at least partly sunk into the metal workpieces.

* * * * *